May 15, 1962 F. J. DITTER 3,034,586
SOD CUTTING KNIFE
Filed Feb. 25, 1955
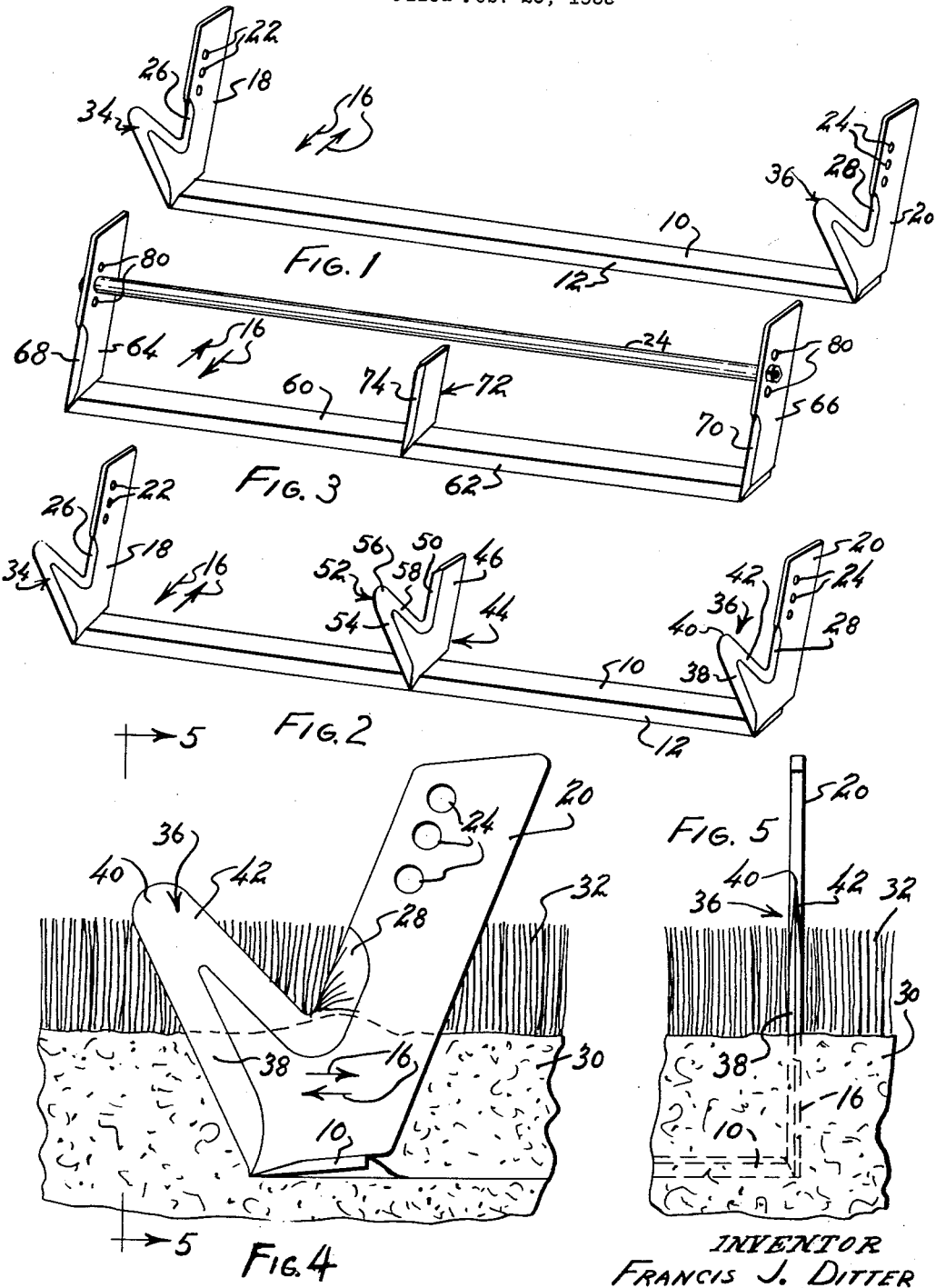
INVENTOR
FRANCIS J. DITTER
BY William C. Strueber
ATTORNEY : 3,034,586
Patented May 15, 1962

1

3,034,586
SOD CUTTING KNIFE
Francis J. Ditter, Minneapolis, Minn., assignor to Sod-Master Corporation, Minneapolis, Minn., a corporation of Minnesota
Filed Feb. 25, 1955, Ser. No. 490,447
4 Claims. (Cl. 172—19)

This invention relates to improvements in knives for use with power sod cutting machines for removing a strip of grass sod from a field of turf.

In cutting strips of sod from fields of grass, it has been the practice to use a powered machine which drives a horizontal knife through the turf spaced a distance below the surface of the grass. This removes the upper layer of sod, separating the roots from the earth and cutting through the roots which extend some distance into the ground. The strips of sod which are removed are then cut into lengths and rolled up to be transported to another location where the sod is to be laid to create a lawn.

Difficulties are encountered in some grasses, however, which have very tough stems and perhaps a stem which is long and intertwines with adjoining stems. In this grass the strips after being cut are not easily separable, for the tendrils are not fully cut but in cutting are torn unevenly and will spring back to form an uneven edge.

Further, much of the grass is not completely cut and bunches up on the side supports for the knife so that the machine must be frequently stopped to clean off the knife to continue operation.

It is accordingly an object of the present invention to provide an improved sod-cutting knife which will readily and easily cut sod in long tough grass, will thoroughly cut the stems of the grass as well as separate a layer of sod and will not tear the grass and bunch it to require stopping the machine.

It is another object to provide an improved knife with a plurality of cutting edges which extend upwardly through the stems of the grass above the surface of the ground to insure that the grass of each strip of sod will be severed from the adjoining strip.

It is a further object of the invention to provide an improved sod cutting knife which will cleanly cut a plurality of strips of sod in a single pass through the turf.

Other objects and advantages will become more apparent in the following specification taken in connection with the drawings in which:

FIGURE 1 is a perspective view of the preferred embodiment of the sod cutting knife of the present invention;

FIG. 2 is a perspective view of a modification of the invention also used for cutting a plurality of strips of sod from heavy grasses;

FIG. 3 is a perspective view of another embodiment of the invention used for cutting a plurality of strips of sod;

FIG. 4 is an enlarged side elevation of the vertical portion of the grass cutting blade; and FIG. 5 is an enlarged front elevation of the vertical portion of the grass cutting blade.

The sod-cutting knife is illustrated in FIG. 1 with a horizontal cutting blade 10 formed of steel and having a forward sharpened cutting edge 12. The edge is preferably formed by grinding the blade from the top so as to leave a flat bottom surface. This increases the lifting action of the blade as it cuts the roots of the grass when it is separating a strip of sod from the earth.

The blade usually is positioned in its movement to be inclined rearwardly and upwardly with the leading cutting edge 12 lower than the rest of the blade. Thus the strip of sod will be raised as the knife cuts it from the earth.

The angle of the knife with the horizontal may be small but if too close to horizontal a vertical reactive force from the ground will be encountered causing unsatisfactory bucking of the sod machine.

The angle of the cutting knife is illustrated in FIG. 4 with the arrows 16 showing the path of movement of the blade. As the blade is given this rapid oscillatory motion, indicated by the arrows, it is, of course, carried forward through the turf to cut the sod strip.

The horizontal blade is supported from the sod machine by blade carrying members 18 and 20. These members are flattened pieces of steel which are attached to each end of the horizontal cutter blade and extend upwardly to be in vertical planes extending upwardly from the ends of the horizontal blade. The vertical carrying members may be attached to the blade as by welding or may be integral therewith, being formed out of the same piece of steel as the blade.

The vertical flat carrier members extend upwardly so that the blade will be carried forward into the sod with somewhat of a pushing motion. Up on the shank of the blade a series of holes 22 and 24 are drilled for purposes of attaching the cutting knife to the sod machine. The holes lie along the axis of the blade so that different holes may be used to attach the blade at different heights with respect to the sod machine to adjust the depth beneath the top surface of the grass at which the horizontal cutting blade 10 will be carried.

Frequently the sod machine will be provided with a spacer bar similar to that shown at 24 in the embodiment of FIG. 3, which functions to fix the distance between the carrier members and lend rigidity to the connection between the cutting knife and the sod machine.

The forward lower edges 26 and 28 of the carrier members are sharpened so that as the knife oscillates forward and the horizontal blade cuts and raises the sod strip, the edges of the strip will also be cut and separated from the adjoining turf.

As is illustrated in FIG. 4 the sod strip consists of the lower root portion 30 and the upper stem or tendril portion 32. This stem portion is often difficult to cut and separate from the adjoining turf because while it is tough, it is loose and will give as the knife moves forward. Where the grass tendrils are long and intertwine, they may not be cut but may be pulled out so that they will bunch and climb up on the forward edge of the carrier members 18 and 20. This hampers the movement of the knife and when the cutting edge is fouled with grass clinging to it, it cannot effectively cut through successive stems of grass. The grass stems instead of being cut are torn unevenly and make the edge of the sod uneven, which is obviously undesirable.

To insure that the grass tendrils of the sod strips will be cleanly cut the tendril-cutting points 34 and 36 are provided. These points, as is illustrated in FIGS. 1, 2, and 4, project forwardly and extend above the surface of the grass 32.

The forward edge 38 is sharpened to cut through the grass on the forward stroke of the knife. This forward sharpened edge faces downwardly so that the grass will be pushed downward in the forward movement and will not have a tendency to climb upwardly on the carrier as it might if no tendril-cutting point were present. Thus if a grass stem is not cut in one forward motion of the blade it is forced downwardly against the earth where it will be solidly packed to be cut on the next forward motion. It will be borne in mind that much of this grass will be tangled and lie in various horizontal directions so that it can be pressed readily downwardly by the forwardly extending point.

The point is sharpened on its forward face at 38 and also up over its tip at 40 so that if any of the tendrils attempt to creep over the tip of the blade, they will be met with a horizontally slashing sharpened tip.

Some long tendrils may, of course, escape the front edge and the sharpened tip but they will pull down into the V-shaped opening which is defined between the front sharpened edge 28 of the carrier 20 and the rear sharpened edge 42 of the tendril-cutting point, this edge also being sharpened. As the stray tendrils creep into this V, they will be buffeted between the two sharpened edges 42 and 28, one of which will sever them.

Thus the grass, no matter how tough, stringy and interlaced, will be cut, and a neat even-edged section of sod will result. The numerous sharpened edges will insure severance of the grass tendrils and will tend to remain sharp for a longer period than if only one cutting edge is present.

In certain instances it may be desirable to form narrower strips of sod. These occasions arise when the sod is to be used where a certain limited size must be employed or where only a narrow strip is needed and there is no need to waste sod by using more than needed. It has heretofore been the practice to use a narrower sod knife of size equal to the strip needed.

In the embodiment illustrated in FIG. 2 a narrower strip of sod is cut but two strips are cut at once thereby reducing to one-half the number of trips which are usually necessary to cross a field.

At the midpoint of the horizontal blade, a central strip-separating blade 44 is provided. This blade is similar to the end blades which consist of the combination of the carrier members and the tendril-cutting point. As pictured, the blade 44 is supported solely by the horizontal cutting blade 10. Therefore no need exists for any apertures in its section 46, although said section 46 is formed with a forward edge 50 corresponding in function to the earlier mentioned edges 26 and 28.

In FIG. 2 the basic structure is similar to FIG. 1 with the horizontal blade 10 being supported by the carrier members 18 and 20. Tendril-cutting points also numbered 34 and 36 are provided on each end of the horizontal blade 10.

Ahead of the central strip separating blade 44 projects a tendril-separating point 52 which has a sharpened forward edge 54, a sharpened point 56, and a sharpened rear edge 58. The point and its sharpened edges perform identically to the points at the ends of the blade to cut the tendrils of grass and separate the sod strips.

In some cases a plurality of strips may be desired where the grass stems extending above the grass are short or tender so there is no difficulty in separating the strips from the adjoining turf or from each other. In these circumstances, the forward projecting tendril-separating point may be omitted and the cutting knife illustrated in FIG. 3 may be used.

This knife has a horizontal sod-separating and cutting blade 60 with a forward sharpened edge 62. At each end of the sharpened horizontal edge a vertical flat carrier member 64 and 66 is attached, which is sharpened at its forward edge 68 and 70 to cut the edges of the sod strips to separate them from the turf. A strip-separating blade member 72 is secured at the center of the horizontal blade and has a sharpened front edge 74. This edge serves to separate into two strips the layer of sod which is cut from the turf by the horizontal blade.

The two carrier members 64 and 66 are provided with one or more holes 80 for purposes of attaching the knife to the power sod machine.

It is to be understood that in some instances it may be desirable to cut more than two strips of sod. In those cases more separating blades such as 44 or 72 in FIGS. 2 and 3, respectively, may be used. The location of the strip-separating blades is chosen in accordance with the width of sod strip desired. Possibly the only limiting factor is the total length of horizontal blade which can be driven and practically used on the sod machine.

The cutting knife of the present invention advantageously meets the objective set forth at the beginning of the specification and obtains a knife inexpensive to manufacture, rugged and strong. The knife may be manufactured and sharpened in a minimum number of steps and is easy to maintain and sharpen in the field.

I have, in the drawings and specification, presented a detailed disclosure of the preferred embodiments of my invention. It is to be understood that the invention is susceptible of modifications, structural changes and various applications of use within the spirit and scope of the invention and I do not intend to limit the invention to the specific form disclosed but intend to cover all modifications, changes and alternative constructions and methods falling within the scope of the principles taught by my invention.

I claim:

1. A unitary cutting knife for separating a strip of sod from a field of turf comprising a cutter blade lying in a horizontal plane and having a horizontal forward sharpened edge, a pair of relatively thin supporting members attached to the cutting blade ends and lying in parallel vertical planes with the distance between said vertical planes equalling the length of said cutter blade, said supporting members each having a rearwardly inclining upper portion in the form of a strip for suspending the blade from a powered sod cutter and moving the blade through the turf with an oscillatory motion, a grass stem-separating blade integral with each supporting member and lying in the same vertical plane therewith and projecting upwardly above the surface of the grass from each end of the cutter blade, and a forward cutting edge on each stem-separating blade inclining in a forward direction from a bottom locus near said horizontal edge to an upper locus spaced substantially forwardly of the forward edge of each of said strip portions so that the grass stems are forced downwardly as they are cut.

2. A sod cutting knife in accordance with claim 1 in which said strip portions and said stem-separating blades each form a generally V-shaped supporting member when viewed from either end of the knife, the width of each supporting member at the base of the notch formed by said V-shaped configuration being substantially greater than that of said strip portions.

3. A cutting knife for separating a strip of sod from a field of turf comprising a cutter blade having a horizontal forward cutting edge for separating the roots of the grass to separate the sod from the earth, carrying members attached to the ends of the blade and extending in a vertical plane to carry the blade on a power sod cutter and to impart an oscillatory motion thereto to cut the sod, the carrying members being thin so as to pass easily through the turf, separating blades also carried at the ends of the cutter blade positioned ahead of the carrying members and extending upwardly from a lower portion of said carrying members to project above the top of the grass, a forward sharpened cutting edge on each of the separating blades to cut the grass stems in the forward motion of the blade, and a rear sharpened cutting edge on each of the separating blades to cut the grass stems in the rearward motion of the blade.

4. A cutting knife for separating a strip of sod from a field of turf comprising a horizontal cutter blade having a sharpened forward edge for separating the roots of the sod from the earth, a pair of supporting blades disposed in vertical planes with their ends secured to each end of the cutter blade to support it from a powered sod cutter and carry it with an oscillatory motion through the turf, stem-cutting blades projecting forwardly from the supporting blades at the ends of the horizontal cutter blade to extend above the surface of the grass, a first forward sharpened cutting edge on the forward edge of the stem-cutting blades to cut the grass stems in the forward motion of the knife, a rear sharpened cutting edge on the rear edge of the stem-cutting blades, to cut the grass stems on the rearward motion of the cutting knife, and a second forward cutting edge on the forward edge of the supporting blades to cut the stems of the grass which are not cut by said stem-cutting blades.

References Cited in the file of this patent

UNITED STATES PATENTS

| 549,730 | Lane | Nov. 12, 1895 |
| 2,702,502 | Rogneby | Feb. 22, 1955 |

FOREIGN PATENTS

| 110,527 | Australia | May 16, 1940 |
| 523,464 | Great Britain | of 1940 |
| 675,822 | Great Britain | July 16, 1952 |